United States Patent [19]

Wyse

[11] Patent Number: 5,722,515
[45] Date of Patent: Mar. 3, 1998

[54] HAND CART BRAKING SYSTEM

[76] Inventor: Gene Wyse, 10510 County Rd. 12, Wauseon, Ohio 43567

[21] Appl. No.: 788,381

[22] Filed: Jan. 27, 1997

[51] Int. Cl.$^6$ ...................................................... B60T 1/04
[52] U.S. Cl. .................... 188/22; 188/77 W; 188/71.5; 280/47.27
[58] Field of Search .................. 188/19, 21, 22, 188/77 W, 71.5; 280/47.27, 47.28; 464/182

[56] References Cited

U.S. PATENT DOCUMENTS

| | | |
|---|---|---|
| 2,738,034 | 3/1956 | Levine . |
| 3,276,550 | 10/1966 | Honeyman . |
| 3,422,930 | 1/1969 | Barron . |
| 3,486,587 | 12/1969 | Malloy . |
| 3,532,188 | 10/1970 | Kelz . |
| 3,623,575 | 11/1971 | Joseph . |
| 3,945,472 | 3/1976 | Peters et al. . |
| 3,968,974 | 7/1976 | Wetzel . |
| 4,142,732 | 3/1979 | Boyd . |
| 4,819,767 | 4/1989 | Laird . |
| 5,090,517 | 2/1992 | Doughty . |
| 5,113,977 | 5/1992 | Rigings et al. . |
| 5,390,943 | 2/1995 | Hedrick . |
| 5,433,464 | 7/1995 | Hlebakos . |
| 5,524,731 | 6/1996 | Grieg . |

*Primary Examiner*—Matthew C. Graham
*Assistant Examiner*—Chris Schwartz
*Attorney, Agent, or Firm*—Marshall & Melhorn

[57] ABSTRACT

A braking system is provided having a rotatable split axle mounted laterally between the wheels of the hand cart. The axle is split in the middle of the axle to form two distinct segments. The adjacent ends of the axle have a longitudinal hole drilled in the axles and a pin is inserted between the holes to connect the two segments of the axle. A fixed hub for mounting the wheels is secured at the ends of the axle. The axle extends through bearing mounted on a bearing support brackets at the bottom of the hand cart. Each axle segment rotates with its respective wheel, and the axle segment and wheel on one side of the cart rotate independently of the other axle segment and wheel combination. A brake is mounted on the axle at the junction of the two axle segments. An actuator handle is mounted on the cart at a convenient point for actuating the brake. When the brake is manually operated, the braking force is applied to both segments of the axle to smoothly stop the hand cart. The brake is preferably a disc brake or a drum brake, although other braking devices may also be used in the present system.

19 Claims, 5 Drawing Sheets

HAND CART BRAKING SYSTEM

BACKGROUND OF THE INVENTION

1. Field of the Invention

The present invention relates to a hand operated braking system for a hand cart. More particularly, the present invention includes a hand cart braking system with a rotatable split axle extending between the wheels of the hand cart and a center mounted brake positioned at the junction of the two axle segments.

2. Summary of Related Art

Hand carts are well known in the material handling industry for loading and unloading material from trucks and trailers. Hand carts are used not only at truck loading docks, but also at retail establishments and other delivery points. Hand carts are also essential devices for moving loads within warehouses and production facilities. The primary construction of a hand cart includes two wheels on a single axle, two vertical frame members with cross frame members, a handle at the top of the frame, and a load engaging flange plate at the bottom of the frame. A typical braking system for a hand cart is a hand operated system positioned on the handle at the top of the frame.

A significant problem which occurs during use of a hand cart is controlling a loaded hand cart on an inclined surface. Inclined surfaces are encountered quite frequently in many hand cart applications, such as maneuvering hand carts up and down truck unloading ramps. The inability to control a loaded hand cart on an inclined surface frequently results in damage to the load being moved and injury to the person operating the hand cart.

When using a hand cart, the operator will frequently use only one hand to control the cart and the other hand is used to engage and steady the load being carried on the cart. Since the operator utilizes one hand on the load, the braking systems on hand carts are generally positioned at the handle and designed for one hand operation.

One of the problems with braking systems on hand carts is that the braking force should be applied uniformly to the two wheels. When the braking force is applied unevenly, the hand cart will not roll in a straight path and will swing to one side. When an operator is applying the brake while rolling a loaded hand cart down a loading ramp, uniform braking to facilitate straight path operation is essential.

Another requirement for hand cart operation is maneuverability. Since hand carts must be operable on a non-linear path when moving a load, it is essential that the braking system not adversely effect the maneuverability of the hand cart. Independent operation of the wheels is required to permit the hand cart to turn corners in a controlled manner.

A majority of hand carts do not have any braking capabilities and the person using the hand cart must use their own strength to stop and/or control a cart on an inclined surface. Several braking systems for hand carts are disclosed in the prior art. The hand carts of the prior art typically include independent wheels and a fixed axle which are mounted on a bracket or other mounting means on the lower corners of the frame. A separate braking mechanism is required for each of the wheels. One of the problems with the prior art systems has been achieving uniform braking force at the two wheels.

In the prior art, Honeyman (U.S. Pat. No. 3,276,550) discloses an U-shaped brake rod mounted between the two wheels. Projecting ends are positioned above the wheels to form a braking means. When the handle is pulled, the projecting ends are positioned in front of the wheels such that a braking force is applied to limit the rotation of the wheels. The forward movement of the wheels tends to cause greater engagement between the wheels and the projecting ends which creates a self actuating feature.

In attempting to improve the maneuverability of the hand cart during braking, Malloy (U.S. Pat. No. 3,486,587) discloses the benefits of having independent operation of the brakes with a single operating handle. A special linkage is attached to the brake shoes of the wheels to provide independent braking.

Wetzel (U.S. Pat. No. 3,368,974) discloses wheels mounted by separate bearings mounted on a fixed axle to provide for independent rotation. A hydraulic system is used to actuate a caliper-type disc brake system mounted at each of the wheels. Equal braking force is applied to each of the wheels. Boyd (U.S. Pat. No. 4,142,732) teaches a disc braking system to brake the main axle shown in the specialized hand cart. The wheels are independently mounted on star-shaped plates, and the plates rotate when the cart is used on stairs. The hand brake system locks the main axle to prevent the plates from rotating.

Laird (U.S. Pat. No. 4,819,767) discloses a braking system which can be used on both two-wheel and four-wheel hand carts. Brake discs are mounted in the frame and are selectively extended from the frame to engage the sidewalls of the wheels to prevent rotation of the wheels.

A hand cart having a brake drum mounted about the hub of the wheels is disclosed in Hedrick (U.S. Pat. No. 5,390,943). The wheels operate independently. The brakes are operated by a single handle with two separate brake actuating cables to two independent brakes. The stopping force to each wheel is equalized by a brake adjusting screw on each brake.

Hlebakos (U.S. Pat. No. 5,433,464) shows a braking system having wheels with a braking shoe and backing plate assembly. A pulley system and cam followers are used to provide equal braking pressure to each of the wheels. Such a braking system is intended for retrofitting on existing hand carts.

The braking system disclosed in Grieg (U.S. Pat. No. 5,524,731) teaches a brake bar mounted on the cart and extending between the two wheels of the cart. Brake pads are mounted on the brake bar which engage the wheels. A step plate is attached to the bar to permit the operator to tilt the hand cart into an operating position.

SUMMARY OF THE INVENTION

According to the present invention, there is provided a braking system having a rotatable split axle mounted laterally between the wheels of the hand cart. The split axle has hubs affixed at the outer ends of the axle for connecting the wheels to the split axle. The axle rotates with the wheels as the hand cart is pushed by the operator. The axle is split in the middle of the axle to form two distinct segments. The adjacent ends of the axle have a longitudinal hole drilled in the axles and a pin is inserted between the holes to connect the two segments of the axle. An outer sleeve may also be used to secure the adjacent ends of the axle segments.

Instead of having a fixed axle with the wheels rotatably mounted at the ends of the axle, the present invention provides for a fixed connector at the ends of the axle. The axle extends through bearing mounted on a bearing support at the bottom of the hand cart. Each axle segment rotates with its respective wheel, and the axle segment and wheel on one side of the cart rotate independently of the other axle segment and wheel combination.

A brake is mounted on the axle at the junction of the two axle segments. An actuator handle is mounted on the cart at a convenient point for actuating the brake. A rod or cable extends from the handle along the frame of the cart to the brake mounted on the axle. When the brake is manually operated, the braking force is applied to both segments of the axle to smoothly stop the hand cart. The brake is preferably a disc brake or a drum brake, although other braking devices may also be used in the present system.

The split axle facilitates the independent rotation of the two axle pieces and the wheels which are fixed at opposite ends of the axle. The split axle provides superior operating performance when moving the cart around a turn or in other nonlinear applications.

The axle is mounted on a bearing support frame or bracket which is secured to the frame of the hand cart. The frame includes two bearings, one on each segment of the axle, to facilitate the rotation of the axle. The bearing support bracket includes a cross bar parallel to the split axle to provide a convenient foot pad for use in tilting the loaded hand truck.

The brake can be any type of brake to be mounted on the axle. Mounting the brake at the junction of the axle segments permits the use of a single actuator for braking both axle segments. Drum brake and a disc brake are the two preferred configurations for the system. Each axle segment is provide with a drum. The friction bands for engaging the drums are mounted about the drums between the brackets. The friction bands can be activated by a single actuator. For a disc brake, a disc is welded to each of the axle segments and the friction pads are mounted about the discs.

An object of the present invention is to provide a hand cart braking system that provides an improved braking system that is cost competitive. Many of the braking systems are very complex such that the costs would be unreasonable and too expensive to gain wide spread acceptance in the industry. In other cases, the braking systems do not provide the operating performance needed in hand truck applications on an inclined surface.

An object of the present invention is to provide a hand cart braking system which can be operated with one hand, yet still achieve even braking force at both of the wheels. In addition, the wheels of the cart must operate independently to ensure maneuverability to handle turns and curves.

A further object of the present invention is to design a braking system that can be used with a two wheel upright hand cart or a four wheel flat bed hand cart.

An additional object of the present invention is to provide a braking system which can be mounted on existing hand carts. The axle and wheel mountings on an existing cart can be removed and the bearing support and axle of the present invention can be mounted on the lower segment of the hand cart.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
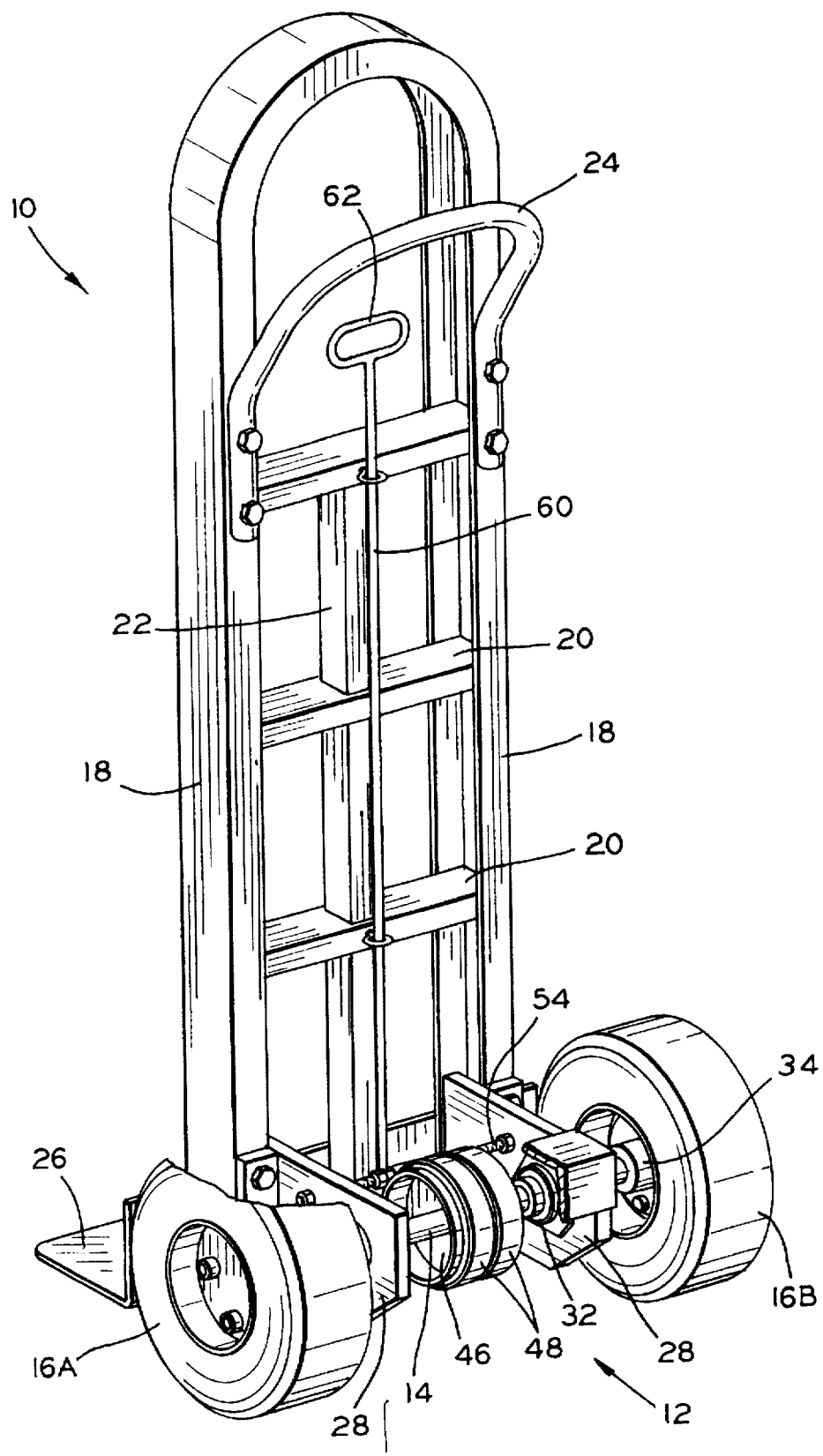
FIG. 1 is a perspective view of the rear of an upright hand cart with the braking system mounted on the cart.

In FIG. 1, the hand cart 10 includes a braking system 12 mounted on the split axle 14 extending between the wheels 16 of the hand cart 10. The hand cart 10 is formed by two elongated, parallel load supporting frame members 18 with cross members 20 and center strut 22. A curved handle 24 is formed at the upper end of the frame members 18. Various handle configurations are known in the industry to facilitate operation of the hand cart 10. The frame members 18 and cross members 20 are typically made from steel or aluminum tubing or bars.

At the front, lower end of the frame members 18, a lifting blade 26 is mounted to extend perpendicularly from the frame members 18. The lifting blade 26 accomplishes the dual function of lifting and supporting objects to be moved by the hand cart and of maintaining the hand cart in an upright position when not in use.

The hand cart 10 includes a pair of laterally spaced wheels 16A,16B mounted at the lower end of the vertical frame members 18. The wheels 16A, 16B may be furnished with any type of tire. Brakes are typically furnished on hand carts used for heavier loads, and such hand carts generally include pneumatic tires.

In the prior art, the typical hand cart included support members with a single fixed axle extending through the support members. At the end of the fixed axle, bearings or other rotational devices are used in the prior art to rotatably connect the wheels to the fixed axle such that the wheels have a fixed direction and rotate independently of one another.

In the present invention, two bearing brackets 28A, 28B are mounted at the lower end of the vertical frame members 16 by flange 30 or other comparable mounting means. The bearing brackets 28A, 28B extend from the frame members 18 between the wheels 16A, 16B. A bearing 32 is secured in each of the brackets 28A, 28B. The brackets 28A, 28B and the bearings 32 are spaced apart and aligned such that the split axle 14 extends from wheel 16A through the bearings 32 to the opposite wheel 16B.

Figure 2:
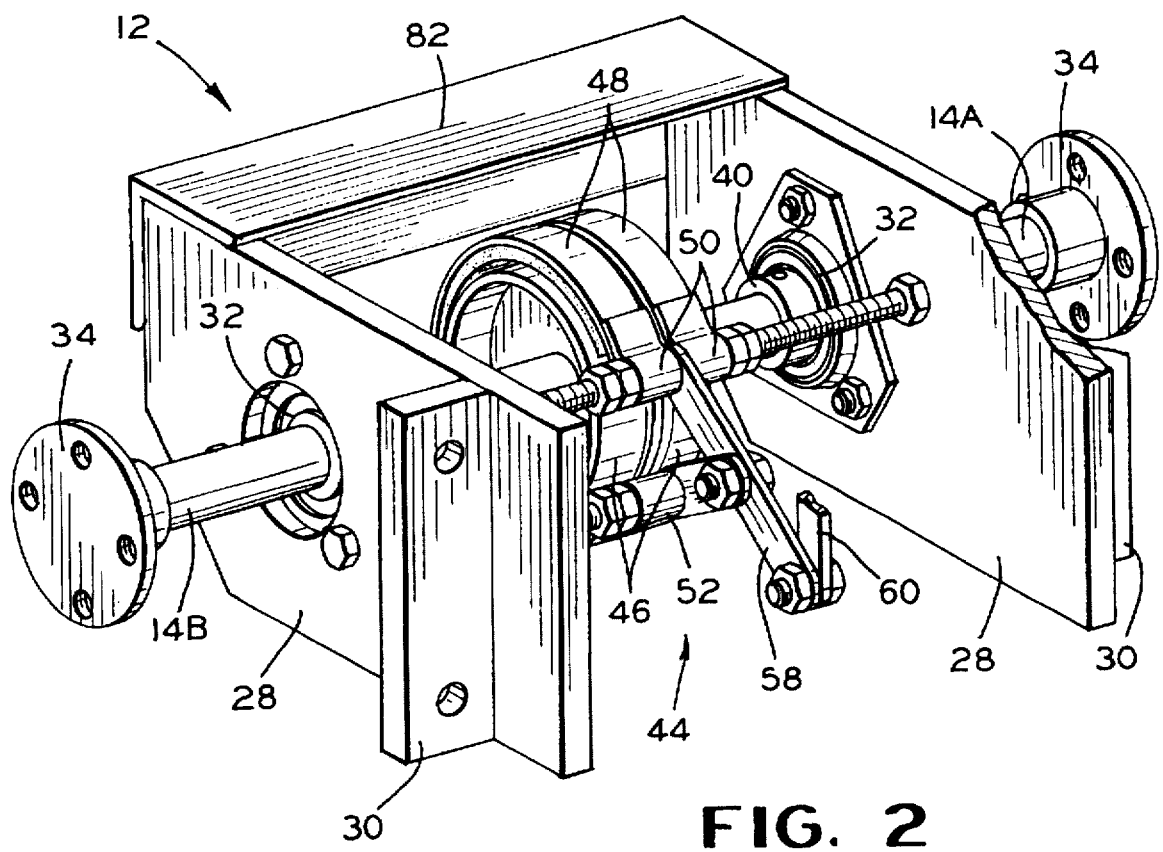
FIG. 2 is a perspective view of the brake assembly showing the drum brake configuration and the wheel hubs for mounting the wheels.

As shown in FIG. 2, the split axle 14 includes a hub 34 affixed on each end of the axle. The hubs 34 are used to secure the rims of the wheels 16A, 16B to the split axle 14 such that split axle 14 rotates when the wheels 16A, 16B rotate.

Figure 3:
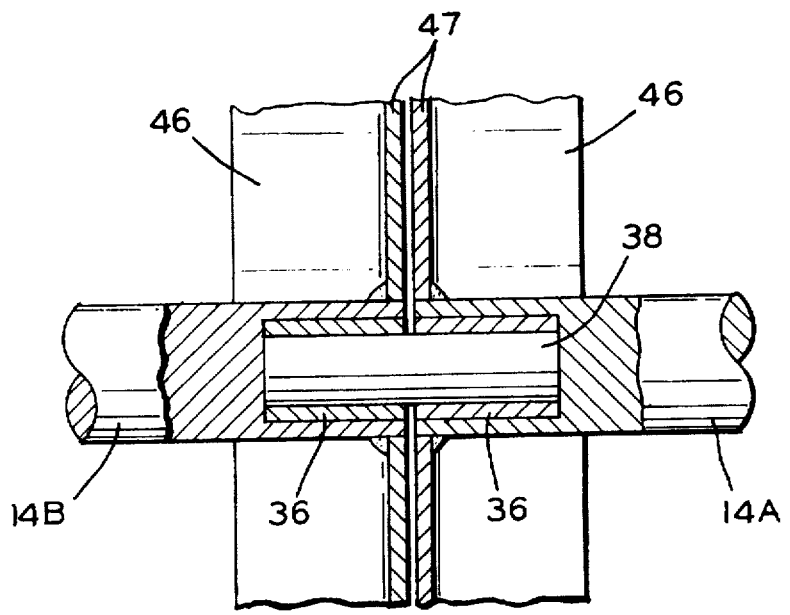
FIG. 3 is a cross sectional view of the split axle and drum brake showing the connecting pin between the two axle segments.
Figure 4:
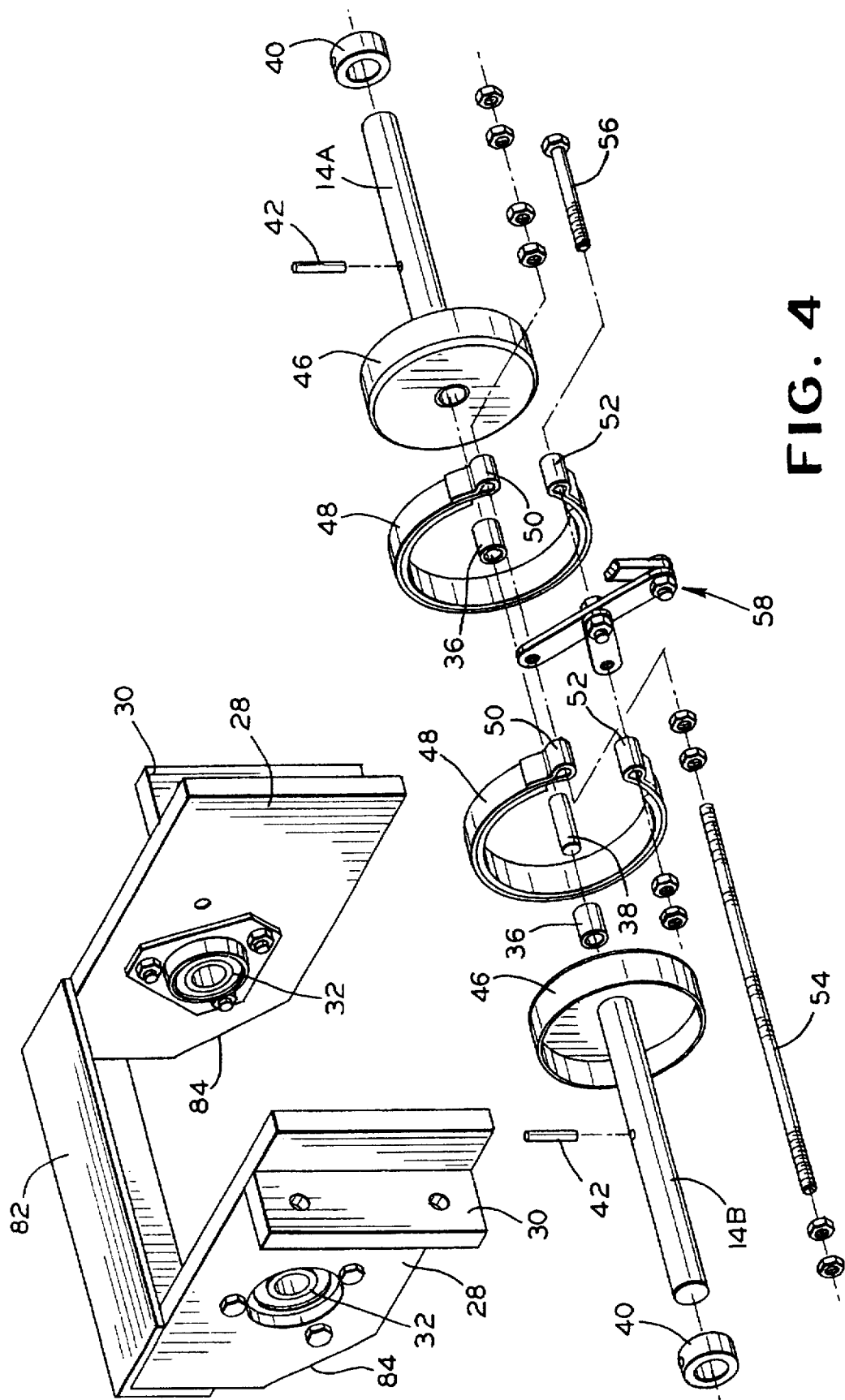
FIG. 4 is an exploded view of a drum brake mounted on the split axle.

The configuration of the split axle 14 is shown in FIGS. 3 and 4. The split axle 14 is a solid shaft which is formed by a segment 14A attached to wheel 16A and a segment 14B attached to wheel 16B. The segments 16A, 16B are preferably of equal diameter and would generally be cut from the same stock of steel or other acceptable material. The length of the split axle segments 14A, 14B are sized based on the width of the hand cart 10 and the distance between the wheels 16A, 16B. The axle segments 14A, 14B are typically of equal length such that the split occurs in the middle of the overall axle length, but the lengths of the segments 14A, 14B do not have to be equal in length for the brake system.

The adjacent ends c,f the axle segments 14A, 14B are drilled to provide a hole for insertion of bushings 36 and pin 38. This construction facilitates independent rotation of axle segment 14A, which is affixed to wheel 16A, and axle segment 14B, which is affixed to wheel 16B. To prevent axial shifting of the split axle 14, retention collars 40 with pins 42 may be used as shown in FIG. 4.

The spacing between the bearing brackets 28 and the corresponding positioning of the bearings 32 along the axle segments 14A, 14B may be set at any distance. By using a flange 30 to mount the brackets on the inside of the vertical frame members 18, the bearings 32 are positioned towards the middle of the split axle segments 14A, 14B. Although the axle 14 is split, the brackets 28 and bearing 32 provide excellent support for the axle 14 such that smooth operation of the hand cart 10 is maintained.

The braking action may be provided by any type of mechanical, hydraulic, or electrical brake. FIGS. 1–4 show a mechanical drum brake system 44. Each of the split axle segments 14A, 14B is provided with a brake drum 46 welded to such segment. The brake drums 46 are preferably positioned at the end of the axle segments 14A, 14B adjacent the junction of the segments. The positioning of the drums 46 facilitates the use of a single actuator to brake both of the axle segments 14A, 14B and wheels 16A, 16B. A corresponding friction band 48 is positioned about the brake drums 46 for selectively engaging the outer surfaces of the brake drums 46. The drum brake system 44 may utilize a single friction band to engage both of the drums 46 or two separate bands 48 may be used as shown in FIG. 4. Each friction band 48 has a fixed end 50 and a moveable end 52. A mounting rod 54 extends through the loops in the fixed end 50 of the bands 48. The rod 54, which may be an elongated bolt with a threaded end, passes through the two bearing brackets 28 and is bolted to the brackets 28 to secure the end 50 of the bands 48.

The moveable ends 52 of the bands 48 are connected by a connector 56. Such a connector is not needed if a single band is used for both of the drums 46. The moveable ends are connected through linkage 58 and cable 60 to pull handle 62. When the handle 62 is pulled, the bands 48 are tightened about the drums 46 to provide the desired braking action. Various linkages may be used to tighten the bands 48. The cable is typically secured to one of the frame members 18 or the center strut 22. The operator of the hand cart 10 will often use one hand to secure a load on the lifting blade 26 and use the other hand to control movement of the hand cart 10. When operating the hand cart 10 with one hand, the hand will usually be positioned near the center of the handle 24 at the top of the cart 10. The pull handle 62 will be configured near the center of the handle 24 so that the operator can activate the drum brake system 44 by pulling on the handle with the hand on the cart 10. The pull handle 62 can be of any configuration known in the art. An extended bar handle, such as the safety handles used on power lawn mowers, would provide a convenient system for one-handed operation of the hand cart 10 and brake system 12. The pull handle 62 shown in FIG. 1 does not have to be positioned near the center of the handle 24 and can be move to the position on the handle 24 most convenient for the operator.

Figure 5:
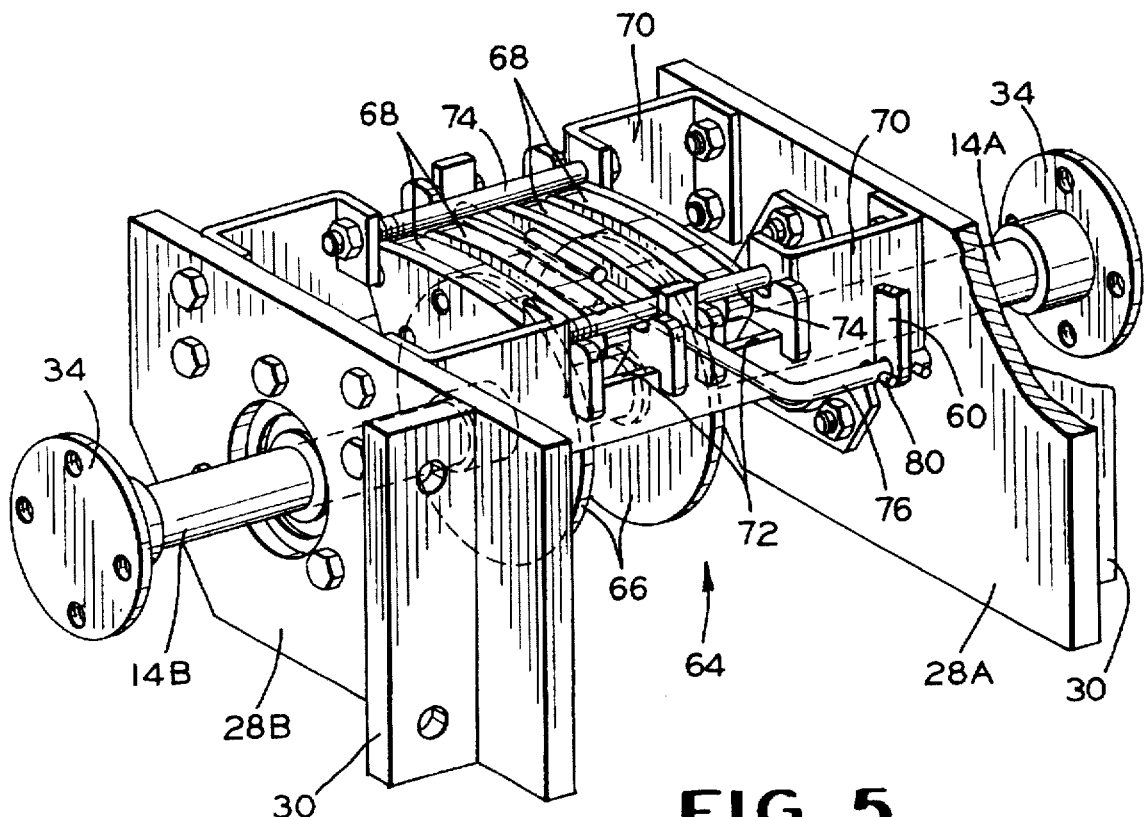
FIG. 5 is a perspective view of a disc brake mounted on the split axle of the braking system.
Figure 6:
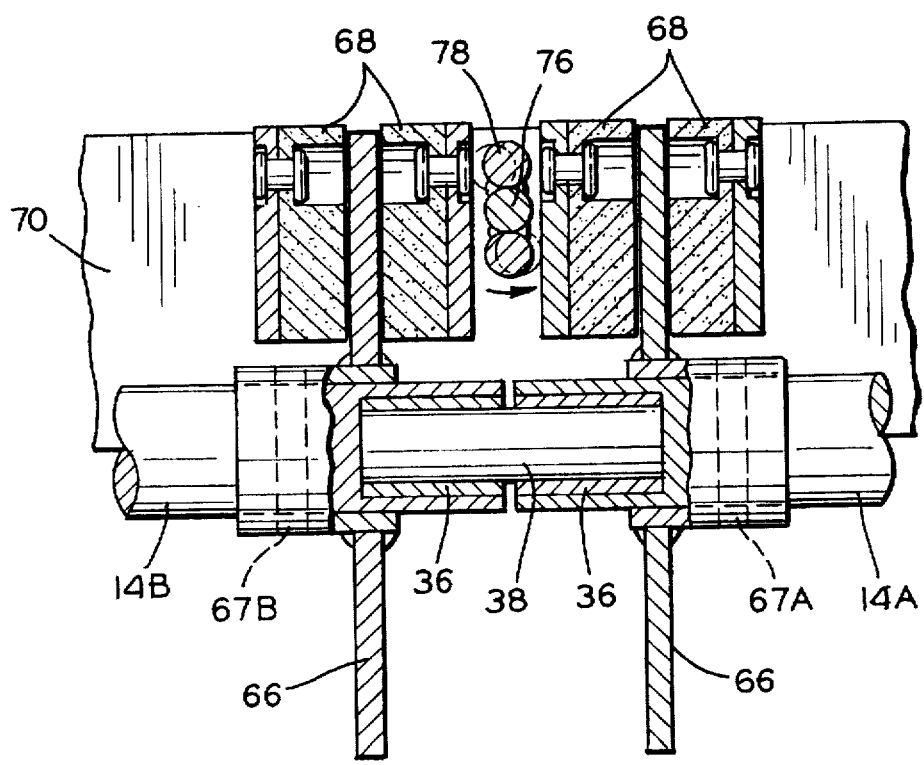
FIG. 6 is a cross sectional view of the split axle and disc brake.

An alternative braking system is shown in FIGS. 5–6. The bearing brackets 28, split axle 14, and wheel hubs 34 are identical to the structure shown in FIGS. 1–4. Instead of using a drum brake, FIGS. 5–6 show a disc brake system 64. Each of the split axle segments 14A, 14B includes a disc 66A, 66B welded or otherwise secured on the segment near the center end of the segment 14A, 14B, for example by means of pins 67A and 67B. A pair of friction pads 68 are position about the discs 66A, 66B. The friction pads 68 extend between and are mounted on pad brackets 70. The pad brackets 70 are secured to and extend between the bearing brackets 28. The pad brackets 70 include a notch 72 for positioning the friction pads 68 in the desired location for operation. A latch bar retains the friction pads 70 in the notches 72.

The disc brake system 64 is operated by an actuator arm 76 positioned between the two interior friction pads 68. The actuator arm 76 includes a cam 78 formed along the arm and positioned between the friction pads 68 in a narrow or thin configuration. When the arm is rotated for operation, the rotation of the cam 78 to a wide position forces the friction pads into the discs 66A, 66B to brake the axle segments 14A, 14B and the respective wheels 16A, 16B. The spacing in the notches 72 is sufficient to allow the axle segments 14A, 14B to freely rotate when the disc brake system 64 is not activated. When the actuator 76 is rotated and the cam 78 widens, the side wall of the notches 72 retains the friction pads 68 to facilitate the engagement of the friction pads 68 against the disc 66A, 66B to stop rotation of the axle segments 14A, 14B. A pinned aperture 80 in cable 60 or other linkage may be used with the same pull handle 62 and cable 60 configuration for moving the actuator arm 76 to operate the disc brake system 64.

Figure 7:
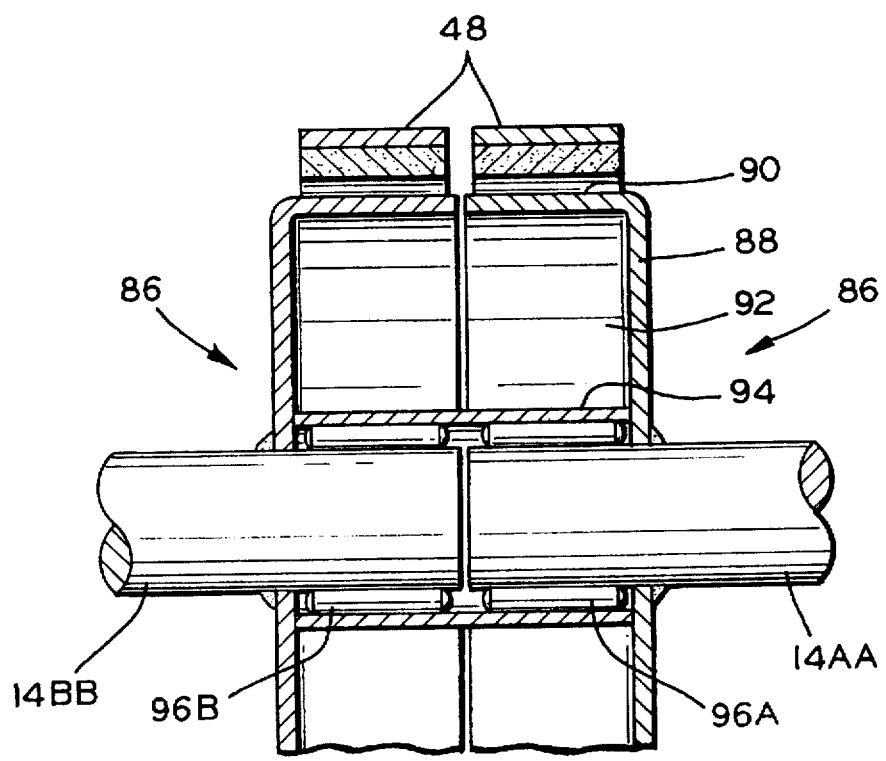
FIG. 7 is a cross sectional view of an alternative drum brake configuration showing a sleeve connector for joining the adjacent ends of the split shaft.

FIG. 7 shows an alternative drum brake configuration with a pipe sleeve connector for connecting the two adjacent ends of the split axle segments 14AA,14BB. The split axle segments 14AA,14BB are solid shafts and do not have any holes drilled longitudinally in the end. Each drum 86 is an open style drum with a single side wall 88 and an outer circumferential surface 90. The drums 86 are welded or otherwise connected to the segments 14AA,14BB. Open style drums 46 are also used in the pin connection shown in FIG. 3, but the configuration of the open side of the drums 46 have been reversed. In the pin connection of FIG. 3, the drums 46 have side walls 47 positioned adjacent each other with the open side of the drum 48 facing outwardly from the junction of the split axle segments 14 A, 14B. In the sleeve connection shown in FIG. 7, the side walls 88 are facing outwardly, and a cavity 92 is formed between the two side walls 86 of the drums 84.

In FIG. 7, a pipe sleeve 94 is positioned in the cavity 92 to connect the split axle segments 14AA,14BB. Once both ends of the segments 14AA,14BB are positioned in the sleeve 94, collar 40 prevents axial movement of the shaft segments 14AA, 14BB and the side walls 88 prevent any axial movement of the sleeve 94. Two needle bearings 96A, 96B are positioned in the sleeve 94 to facilitate the independent rotation of the split axle segments 14AA,14BB. The mounting of the bands 48 is the same in both drum brake embodiments. The bands 48 engage the outer surface 90 of the drums 86 to stop the rotation of the split axle segments 14AA,14BB.

The hand cart 10 has been shown with a drum brake system 44 and a disc brake system 64. Other brake systems can also be used with the split axle 14 of the hand cart. Mounting the braking system at the junction of the two axle segments 14A, 14B permits one brake system to stop both wheels 16A, 16B. The brake systems could include not only mechanical systems, but also hydraulic and electrical systems. The cable 60 and pull handle 62 used to actuate the mechanical brakes are known in the industry and come in a variety of shapes and mounting configurations. The type of the actuator system and the positioning of the actuator on the hand cart can be adjusted to meet the preferences of the users of the hand cart 10.

The hand cart 10 includes additional features to facilitate the operation of the hand cart 10. A foot bar 82 is included across the top of the bearing brackets 28. When the operator of the hand cart 10 starts to tilt the cart 10 backward to lift the load positioned on the lifting blade 26, the operators will generally use a foot to secure the cart 10 while he is tilting the cart 10 to an operating position. The foot bar 82 can be used by the operator. The corner edge 84 of the bearing brackets 28 has been cut off. This permits the hand cart to be tilted into an operating position without damaging the floor. A cover (not shown) could be secured along the top edge of the bearing brackets 28 to protect the braking system.

The present invention permits the even braking of both wheels with a single manual control. The braking force applied to the brakes is generally equal so that a smooth and straight stop can be achieved. In addition, the improved handling is achieved with the split axle. Split axle segment 14A and wheel 16A rotate independently of split axle segment 14B and wheel 16B. This ability to rotate at different speeds when moving the cart in a non-linear direction, such as when turning a corner, is essential to the maneuverability of the hand cart.

The braking system of the present invention could also be used on a flat bed hand cart, which has a flat, load surface supported generally parallel to the ground by four wheels/ two axles. Frame members are provide which extend perpendicularly from the load surface to provide the operators with a structure to push the cart. The bearing brackets are secured to the lower face of the load surface to permit the use of the split axle and brake system on one of the axles.

The braking system of the present invention can be supplied as an original equipment item on new hand carts. In addition, the split shaft 14 and brake system 44 can be sold as kits for retrofitting on existing carts.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A brake assembly mounted on a hand cart having a frame and a pair of laterally spaced wheels, said brake assembly comprising:

a pair of bearing brackets connected to a hand cart in spaced-apart relationship and extending from the hand cart between a pair of laterally spaced wheels;

a bearing mounted in each of said bearing brackets and aligned between the wheels;

a split axle rotatably mounted in said bearings, said split axle including a first axle segment connected to a first wheel, a second axle segment connected to a second wheel, and a connection means positioned at an end-to-end junction of the two axle segments for facilitating the independent rotation of the axle segments and the respective wheels;

a brake mounted on said split axle at said connection means for selectively and simultaneously engaging the first and second axle segments of said split axle; and an actuator mounted on the frame of the hand cart, said actuator connected to said brake for selectively causing said brake to engage said split axle.

2. The brake assembly defined in claim 1, wherein said brake is a drum brake.

3. The brake assembly defined in claim 2, wherein said drum brake includes a drum mounted on each axle segment, and a friction band secured between the bearing brackets and positioned about each of said drums, said friction band being connected to said actuator for selectively engaging said drums.

4. The brake assembly defined in claim 2, wherein the connection means includes a sleeve with two bearings for aligning the first and second axle segments and facilitating the independent rotation of the axle segments.

5. The brake assembly defined in claim 1, wherein said brake is a disc brake.

6. The brake assembly defined in claim 5, wherein said disc brake includes a disc mounted on each axle segment, and a friction pad secured between the bearing brackets and positioned about said discs, said friction pads being connected to said actuator for selectively engaging said discs.

7. The brake assembly defined in claim 1, wherein the first axle segment of said split axle includes a hole drilled in an end surface adjacent the second axle segment, the second axle segment includes a hole drilled in an end surface adjacent the first axle segment, and the connection means includes a pin extending between the holes in the first and second axle segments of said split axle.

8. The brake assembly defined in claim 7, including bushings positioned in the holes of the first and second axle segments.

9. The brake assembly defined in claim 1, wherein said actuator includes a handle mechanism mounted on the frame and a cable extending from the handle mechanism to said brake.

10. A brakeable hand cart comprising the combination of:

a frame having a surface for supporting a load;

a pair of bearing brackets connected to a lower section of said frame in spaced-apart relationship and extending from the hand cart between a pair of laterally spaced wheels;

a bearing mounted in each of said bearing brackets and aligned between the wheels;

a split axle rotatably mounted in the bearings of said bearing support and extending laterally across said frame, said split axle including a first axle segment, a second axle segment, and a connection means positioned at an end-to-end junction of the two axle segments for facilitating the independent rotation of the axle segments;

a pair of laterally spaced wheels for movably supporting said frame, including a first wheel connected to the first axle segment and a second wheel connected to the second axle segment such that the first axle segment and first wheel are independently rotatable from the second axle segment and second wheel;

a brake mounted on said split axle at said connection means for selectively and simultaneously engaging the first and second axle segments of said split axle; and an actuator mounted on the frame, said actuator connected to said brake for selectively causing said brake to engage said split axle.

11. The hand cart defined in claim 10, wherein said brake is a drum brake.

12. The hand cart defined in claim 11, wherein said drum brake includes a drum mounted on each axle segment, and a friction band secured between the bearing brackets and positioned about each of said drums, said friction band being connected to said actuator for selectively engaging said drums.

13. The brake assembly defined in claim 11, wherein the connection means includes a sleeve with two bearings for aligning the first and second axle segments and facilitating the independent rotation of the axle segments.

14. The hand cart defined in claim 10, wherein said brake is a disc brake.

15. The hand cart defined in claim 14, wherein said disc brake includes a disc mounted on each axle segment, and a friction pad secured between the bearing brackets and positioned about said discs, said friction pads being connected to said actuator for selectively engaging said discs.

16. The hand cart defined in claim 10, wherein, the first axle segment of said split axle includes a hole drilled in an end surface adjacent the second axle segment, the second axle segment includes a hole drilled in an end surface adjacent the first axle segment, and the connection means includes a pin extending between the holes in the first and second axle segments of said split axle.

17. The hand cart defined in claim 16, including bushings positioned in the holes of the first and second axle segments.

18. The hand cart defined in claim 10, wherein said actuator includes a handle mechanism mounted on the frame and a cable extending from the handle mechanism to said brake.

19. The hand cart defined in claim 10, including a foot bar extending between top edges of said bearing brackets.

* * * * *